United States Patent [19]

Dias et al.

[11] 4,265,843

[45] May 5, 1981

[54] METHOD OF PRODUCING SHAPED SILICON-CARBIDE BODIES

[75] Inventors: Francisco J. Dias; Ashok K. Gupta; Erno Gyarmati, all of Jülich; Marian Kampel, Heinsberg; Hartmut Luhleich, Düren; Rudolf Munzer, Alsdorf; Aristidis Naoumidis, Jülich-Koslar, all of Fed. Rep. of Germany

[73] Assignee: Kernforschungsanlage Julich, Gesellschaft mit beschrankter Haftung, Julich, Fed. Rep. of Germany

[21] Appl. No.: 99,893

[22] Filed: Dec. 3, 1979

[30] Foreign Application Priority Data

Dec. 4, 1978 [DE] Fed. Rep. of Germany ....... 2852410

[51] Int. Cl.³ ............................................. C01B 31/36
[52] U.S. Cl. ....................................... 264/57; 106/44; 264/66; 264/131; 423/345
[58] Field of Search .......................... 423/345; 106/44; 264/57, 66, 131

[56] References Cited

U.S. PATENT DOCUMENTS

| | | | |
|---|---|---|---|
| 2,431,326 | 11/1947 | Heyroth | 423/345 X |
| 3,079,273 | 2/1963 | Johnson | 423/345 X |
| 3,459,504 | 8/1969 | Bracken et al. | 423/345 |
| 3,951,587 | 4/1976 | Alliegro et al. | 406/44 X |
| 4,141,948 | 2/1979 | Laskow | 106/44 X |
| 4,154,787 | 5/1979 | Brown | 423/345 X |
| 4,166,841 | 9/1979 | Noakes et al. | 423/345 |

FOREIGN PATENT DOCUMENTS 866813  5/1961  United Kingdom .................... 423/345

OTHER PUBLICATIONS

Popper et al., "Powder Metallurgy", 1961, No. 8 pp. 113-127.

Primary Examiner—Jack Cooper
Attorney, Agent, or Firm—Karl F. Ross

[57] ABSTRACT

In the production of shaped silicon-carbide bodies, especially tubes which consist predominantly of silicon carbide throughout their thickness for use in nuclear-reactor technology, a carbon-containing preform (body of the desired shape) is contacted with elemental silicon powder at a temperature of 1400° C. to 1500° C. and the silicon-contacted carbon-containing body is thereafter treated at a temperature of 1800° C. to 2000° C. to transform at least the major part of the carbon into silicon carbide.

9 Claims, 1 Drawing Figure

U.S. Patent  May 5, 1981  4,265,843
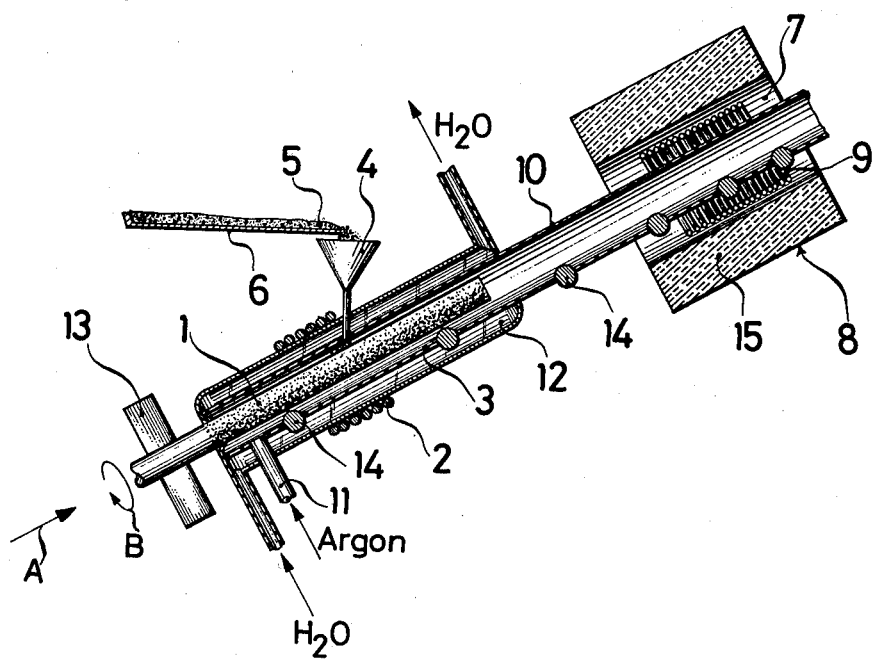

METHOD OF PRODUCING SHAPED SILICON-CARBIDE BODIES

FIELD OF THE INVENTION

Our present invention relates to a method of producing bodies containing silicon carbide or composed predominantly of silicon carbide, especially for nuclear-reactor applications, and to an apparatus for carrying out the improved method. More particularly, our invention relates to a method of and an apparatus for the production of shaped bodies or articles, generally of tubular form, which consist predominantly of silicon carbide at least over the major portion of the wall thickness of the article.

BACKGROUND OF THE INVENTION

It has already been proposed, as the discussion below will show, to provide silicon-carbide articles, bodies or shapes, especially tubular articles, by processes in which a preshaped body containing carbon is subjected to chemical reaction with silicon to form the silicon carbide in situ.

Silicon carbide bodies or articles are used in a variety of nuclear-reactor applications, e.g. as enclosures for nuclear reactor fuels or breeder substances, as ducts or as other passage-defining elements or containers.

In the past, shaped bodies could be treated to form a silicon carbide layer of depths or thicknesses of 7 to 10 mm from the surface at which the siliconization treatment was effected.

In other words, in earlier processes in which transformation of carbon of the body to silicon carbide proceeded inwardly from the surface at which the treatment was applied to the indicated depth transforming all or at least a predominant portion of the carbon in this region to silicon carbide.

The body usually consisted of carbon, a mixture of carbon and silicon carbide powder, or mixtures of either with further refractory materials which were also inert to silicon vapor. The silicon vapor was brought into contact with the body and penetrated the porous or gas-permeable structure and reacted with the carbon.

With earlier treatments of this type having a transformation depth of 7 to 10 mm from the treated surface, it was possible to fabricate articles having a maximum thickness of silicon carbide of about 20 mm. When larger thicknesses of the body were present, the transformation depth was at most 10 mm from each surface, thereby leaving a core of carbon-containing material which was unaffected by the siliconization process.

A number of processes for producing silicon-carbide bodies have been described in the literature and it has been proposed, for example, to hot press a granular or particulate material to produce the preform or shaped carbon-containing article (generally composed of carbon or a mixture and silicon carbide) and then to subject the shaped article to a chemical transformation, hereinafter referred to as siliconization.

For the siliconization step, the preform had to have a significant porosity which could be provided by forming a composition of the carbon-containing particulate (of particle size from say 50 to 100 microns) with a phenolformaldehyde resin powder. As described, for example, in German Pat. Nos. 2,133,044 and 2,360,982, the slurry or mass can be introduced with vibration into a mold and can then be hardened with pore generation by expansion of the vapors, vapor generation or the like and/or such that the entire body was carbonized by a subsequent cokefication treatment.

The resulting porous body consists predominantly of carbon and is especially effective as the starting article for a system of the present invention.

In the conventional siliconization processes, the carbon-containing porous body was introduced into a silicon-containing atmosphere either at ambient or standard pressure and a temperature of about 2000° C. or at a subatmospheric pressure, generally of around 0.5 mbar and a temperature between 1500° and 1700° C. Both of these procedures were effectively used to transform at least surface regions of the carbon body to silicon carbide (see British Pat. No. 866,813 and *Powder Metallurgy*, Vol. 8, pp. 113 ff., 1961).

In German Patent document (Open Application-Offenlegungsschrift) DE-OS No. 2,239,971, graphite-containing silicon carbide bodies, intended to constitute antifriction materials, are produced by impregnating the porous preform composed of graphite with liquid silicon at a temperature of 1700° C. to 2050° C., by immersing the body in a silicon melt. Another system in which liquid silicon impregnation is used is described in "The Fabrication and Properties of Superbonded Silicon Carbide Bodies", TRC Report 2053 (UDC No. 661.665.1).

In German Patent document (Open Application-Offenlegungsschrift) DE-OS No. 2,256,326, a porous shaped body of α-silicon carbide and graphite is transformed in the presence of elemental silicon in vacuum or in an inert gas atmosphere at a temperature of 1400° C. The silicon melts and penetrates the pores to form a body composed of α and β silicon graphite with small residues of elemental silicon. This system differs from that of German Patent document No. 2,239,971 in that the porous body has less graphite and is siliconized at a lower temperature with joint heating of the body and the silicon. By contrast, a molten silicon bath must first be prepared in accordance with the German Patent document.

The German Patent document (Open Application-Offenglegungsschrift) DE-OS No. 2,439,930 describes a process in which an injection molding technique is used to produce bodies of silicon carbide powder with a continuous polymer matrix which, upon hardening, is subjected to pyrolysis at about 1000° C. to produce a porous carbon-bonded body which is siliconized in an evacuated chamber at 1450° to 1600° C.

All of these systems have various disadvantages, ranging from the need for complex equipment and extreme operating parameters or inconvenient conditions, or are inconvenient because of the nature of the steps and preconditions such as the nature of the shaped body in which is to be siliconized. For example, in many cases the preparation and maintenance of a molten silicon bath is not convenient, the generation of silicon in a vapor phase may be undesirable, etc. Frequently, moreover, the prior art process is incapable of being carried out in a simple apparatus or does not result in a deep penetration of the siliconization treatment.

OBJECTS OF THE INVENTION

It is, therefore, the principal object of the present invention to provide an improved method of an apparatus for producing a silicon-carbide body which avoid the disadvantages of earlier systems.

A more specific object of the invention is to provide a method of producing silicon-carbide bodies which can have relatively thick silicon-carbide layers or can be constituted predominantly or entirely of silicon carbide, at relatively low cost, with efficient utilization of silicon and in a relatively inexpensive or simple apparatus.

Another object of this invention is to provide an improved apparatus for carrying out the method of the invention in a particularly economical and convenient manner, especially as the method is applied to tubular articles.

SUMMARY OF THE INVENTION

These objects and others which will become apparent hereinafter in a method wherein a carbon-containing preform, i.e. a porous shaped article or body composed at least in substantial part of carbon, is initially contacted at a temperature of 1400° C. to 1500° C. with silicon and thereafter the silicon-contacted body is subjected in a second stage to a transformation by a thermal treatment or annealing at a temperature between 1800° and 2000° C.

According to an important feature of the invention, the contact of the shaped body with the elemental silicon is a coating or impregnation with silicon powder at the aforementioned temperature of 1400° to 1500° C. Preferably the shaped body to be contacted with the silicon powder is rotated while the silicon powder is deposited thereon.

According to the invention, the silicon powder is deposited upon the shaped body which is advantageously first brought to the temperature of 1400° to 1500° in such fashion as to effect an impregnation of the pores of the body of the silicon powder, the silicon powder being applied in an amount exceeding the stoichiometric quantity required to produce silicon carbide with the carbon of the body and so that, for example, the available pores are filled with silicon powder. Only as this impregnation is completed is the body heated to a temperature at which silicon-carbide forming reaction can occur. This process has the advantage that the silicon-carbide-forming reaction does not interfere with the impregnation.

In prior art systems in which silicon is impregnated into or deposited upon the carbon-containing shaped body in a liquid form, the surface tension and interfacial tension relationships are such with respect to graphite which may be present that impregnation is impeded, molten silicon can flow out of the body and associated disadvantages arise, frequently resulting in damage to the apparatus used.

With the system of the present invention in which the two steps can be carried out under or in an inert gas atmosphere, a continuous production of the articles can be effected without either interruption or significant control problems. The products are of reproducible composition.

We have found, most surprisingly, that the coating of a body and its siliconization in accordance with the present invention can be effected relatively quickly so that, for example, an article can be advanced at a speed of say 3 cm/min through an apparatus for carrying out the method of the present invention, the silicon-carbon reaction being effected with a residence time of about 20 min. at a temperature of about 2000° C.

The deposition of the silicon powder upon the shaped body is advantageously carried out with silicon powder having a particle size up to 100 microns (preferably 10 to 50 microns) in pure argon at a pressure of about 1 bar using a somewhat superstoichiometric quantity of silicon (with reference to the free carbon in the body). The porous body is advantageously rotated during the coating at speeds between 15 and 60 rpm.

It has been found to be advantageous, when elongated tubular silicon carbide bodies are to be produced, to rotate these bodies about their axis which is inclined at about 30° from the horizontal. These parameters have been found to be effective for tubes up to about 20 cm in length.

According to the invention, moreover, the carbon-containing shaped body can have a density from about 0.7 g/cm$^3$ to 1.5 g/cm$^3$ (preferably 0.9 to 1.2 g/cm$^3$) corresponding to a total porosity of 45% to 65% (ratio of pore volume to total volume) thereby producing silicon carbide bodies with a density of 3.00 to 3.14 g/cm$^3$ of optimum strength.

Among the advantages of the present invention over prior art systems are the high speed at which the process can be carried out and the continuity of the process, especially when it is carried out in an apparatus in accordance with the present invention.

BRIEF DESCRIPTION OF THE DRAWING

The above and other objects, features and advantages of the present invention will become more readily apparent from the following description, reference being made to the accompanying drawing in which the sole FIGURE is an axial cross-sectional view, partially in a diagrammatic form, of a quartz tube furnace for for carrying out the method of the present invention.

SPECIFIC DESCRIPTION

The apparatus shown in the drawing for the formation of tubular silicon-carbide bodies, transforms a preshaped body 1 of tubular configuration and composed of carbon or a mixture of carbon and silicon carbide, into the desired product.

The apparatus comprises a furnace 3 provided with an induction heating coil 2 within the body 1 is rotatable by means not shown, about its axis which can be inclined at an angle of, say, 30° to the horizontal. At the upper end of this furnace or at the lower inlet end thereof, a feed device 6 is provided whereby pulverulant silicon is discharged into the furnace via a funnel 4 so that the silicon powder is distributed uniformly on the heated body which is at a temperature of 1400° to 1500° C. as mentioned previously. With horizontal furnaces the powder feed is at the inlet end.

In the heating zone the apparatus has a high temperature furnace 8 with a heating element represented at 9, e.g. of conventional muffle-furnace design, so that the body can be heated to a temperature of the 1800° to 2000° C. for a relatively rapid transformation of the applied silicon and the original carbon to silicon carbide.

The furnace zones 3 and 7 can be connected by a quartz tube section 10 which may be unitary with the quartz tubes of these furnace zones. Argon is fed to the system at 11 so that the steps in both zones take place under an argon atmosphere. In the region of the lower temperature zone, the quartz tube is of the double-wall type as represented at 12, thereby forming a cooling jacket traversed by water around the body 1. The rotating and feed device is the body 1 has been represented at 13 and is capable of advancing the workpiece in the direction of arrow A and rotating same in the direction B as may be required.

The operation of the device shown in the drawing will be readily apparent, the tubular body 1 being rotated and fed axially upwardly as it is heated by the induction coil to a temperature of 1400° to 1500° C., whereupon it is impregnated with the silicon powder in the argon atmosphere at a pressure of 1 bar. The powder can be subjected to slight vibration in the inlet funnel 4 to insure uniform application to the workpiece. When the argon atmosphere is at a slight superatmospheric pressure, reactive gases from the cylinders are prevented from entering the system with the slight outflow of argon serving to keep the powdered material in a loose and flowable state. This applies when the silicon powder is introduced through a funnel as shown in the drawing. Alternatively, the silicon powder can be fed into the furnace from a chamber integrated therewith and in which the furnace pressure prevails.

SPECIFIC EXAMPLES

Example 1

A carbon rod of a density of 1 g/cm$^3$, a length of 15 cm and a diameter of 2 cm is rotated in an inclined position as shown in the drawing in the induction furnace through which argon is passed. The rod is fed at a velocity of 3 cm/min. and is heated to 1500° C. before being brought into contact with the silicon powder (particle size between 20 and 40 microns) so as to uniformly coat the rod with a quantity of silicon slightly greater than the stoichiometric quantity required for reaction with all of the carbon. The rod is then advanced through the second induction furnace 8 where it is heated by its susceptor to about 2000° C. continuously over residence time of 20 min. The product is a silicon carbide rod with a density of 3.05 g/cm$^3$.

Example 2

In a similar apparatus a carbon tube (density 1 g/cm$^3$) of a length of 15 cm, an outer diameter of 2 cm and a wall thickness of 0.5 cm is treated in the first induction furnace as described in Example 1. The rod is provided with graphite fittings through which argon carries silicon powder into contact with the inner wall as well. After a residence time of 10 min. in the first induction furance both inner and outer surfaces are uniformly coated with the silicon powder.

The tube is then heated in the second induction furnace for a residence time of 15 min., but otherwise as described in Example 1 to yield a silicon carbide tube with a density of 3.10 g/cm$^3$.

We claim:

1. A method of making a shaped silicon-carbide body comprising the steps of:
   (a) forming a porous body consisting at least in part of carbon and of a predetermined shape;
   (b) heating the body formed in step (a) to a temperature of substantially 1400° C. to substantially 1500° C.;
   (c) adding silicon powder to the body at said temperature to cause said powder to adhere at least to a surface of said body the so adhered silicon powder impregnating the pores of said body; and
   (d) thereafter heating the silicon-powder-impregnated body of step (c) to a temperature of substantially 1800° C. to substantially 2000° C. for a period sufficient to effect reaction between the silicon powder and the carbon of the body to transform at least a major part of the carbon of said body to silicon carbide.

2. The method defined in claim 1, further comprising the step of rotating said body during the addition of silicon powder thereto in step (c).

3. The method defined in claim 2 wherein said body is a tube and is rotated about its axis during the addition of the silicon powder thereto in step (c) while said axis forms an angle of about 30° with the horizontal.

4. The method defined in claim 1 wherein the silicon powder has a particle size of substantially 10 to 50 microns.

5. The method defined in claim 1 wherein said body is composed of carbon.

6. The method defined in claim 5 wherein said body has a uniform open pore structure and a density of about 0.9 to 1.2 g/cm$^3$.

7. The method defined in claim 1 wherein a quantity of silicon powder is added to said body in step (c) which is at least equal to the stoichiometric amount required to react with all of the carbon of said body.

8. The method defined in claim 1 wherein the heating in step (b) and the treatment in step (d) are carried out in different heating zones of an induction furnace.

9. The method defined in claim 8 wherein steps (b) and (d) are carried out continuously on each body and the body is elongated, the lengths of said zones corresponding to the requisite residence time for the respective heating steps.

* * * * *